United States Patent
Martinez et al.

(10) Patent No.: US 10,655,038 B2
(45) Date of Patent: May 19, 2020

(54) METHOD OF MAKING MAGNETIZABLE ABRASIVE PARTICLES

(71) Applicant: 3M INNOVATIVE PROPERTIES COMPANY, St. Paul, MN (US)

(72) Inventors: Jaime A. Martinez, Woodbury, MN (US); Thomas J. Nelson, St. Paul, MN (US); Mark A. Lukowski, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/344,304

(22) PCT Filed: Oct. 5, 2017

(86) PCT No.: PCT/US2017/055335
§ 371 (c)(1),
(2) Date: Apr. 23, 2019

(87) PCT Pub. No.: WO2018/080755
PCT Pub. Date: May 3, 2018

(65) Prior Publication Data
US 2019/0270921 A1 Sep. 5, 2019

Related U.S. Application Data

(60) Provisional application No. 62/412,459, filed on Oct. 25, 2016.

(51) Int. Cl.
*C09K 3/14* (2006.01)
*B24D 11/00* (2006.01)
*H01F 41/16* (2006.01)

(52) U.S. Cl.
CPC ............ *C09K 3/1409* (2013.01); *B24D 11/00* (2013.01); *C09K 3/1436* (2013.01); *H01F 41/16* (2013.01)

(58) Field of Classification Search
CPC .... C09K 3/1409; C09K 3/1436; B24D 11/00; H01F 41/16
See application file for complete search history.

(56) References Cited

U.S. PATENT DOCUMENTS

| 1,930,788 A | 10/1933 | Buckner |
| 2,216,728 A | 10/1940 | Benner |

(Continued)

FOREIGN PATENT DOCUMENTS

| CN | 86100414 A | 4/1987 |
| CN | 1830626 | 9/2006 |

(Continued)

OTHER PUBLICATIONS

Barbee, Jr., "Microstructure of amorphous 304 stainless steel-carbon alloys synthesized by magnetron sputter deposition", Thin Solid Films, 1979, vol. 63, No. 1, pp. 143-150.

(Continued)

*Primary Examiner* — Pegah Parvini
(74) *Attorney, Agent, or Firm* — Bradford B. Wright

(57) ABSTRACT

A method of making magnetizable abrasive particles includes providing a slurry layer disposed on a substrate. The slurry layer has an exposed surface and comprises magnetic particles, a binder precursor, and a liquid vehicle. Abrasive particles are electrostatically contacted with the slurry layer such that they are aligned substantially oriented perpendicular to the surface of the substrate, and are partially embedded within the slurry layer. The liquid vehicle is at least partially removed from the slurry layer and the binder precursor is converted into a binder to provide a magnetizable layer comprising the magnetic particles partially embedded in the binder. The magnetizable abrasive particles are separated from the releasable substrate. Each magnetizable abrasive particle respectively comprises a por- (Continued)

tion of the magnetizable layer disposed on a portion of an abrasive particle.

6 Claims, 2 Drawing Sheets

(56) References Cited

U.S. PATENT DOCUMENTS

| | | | |
|---|---|---|---|
| 2,318,570 A | 5/1943 | Carlton |
| 2,370,636 A | 3/1945 | Carlton |
| 2,527,044 A | 10/1950 | Walton |
| 2,857,879 A | 10/1958 | Johnson |
| 2,947,616 A | 8/1960 | Coes, Jr. |
| 2,958,593 A | 11/1960 | Hoover |
| 3,306,719 A | 2/1967 | Fringhian |
| 3,495,960 A | 2/1970 | Schladitz |
| 3,625,666 A | 12/1971 | James |
| 3,918,217 A | 11/1975 | Oliver |
| 4,008,055 A | 2/1977 | Phaal |
| 4,018,575 A | 4/1977 | Davis |
| 4,227,350 A | 10/1980 | Fitzer |
| 4,246,004 A | 1/1981 | Busch |
| 4,314,827 A | 2/1982 | Leitheiser |
| 4,331,453 A | 5/1982 | Dau |
| 4,609,380 A | 9/1986 | Barnett |
| 4,612,242 A | 9/1986 | Vesley |
| 4,623,364 A | 11/1986 | Cottringer |
| 4,652,274 A | 3/1987 | Boettcher |
| 4,652,275 A | 3/1987 | Bloecher |
| 4,734,104 A | 3/1988 | Broberg |
| 4,744,802 A | 5/1988 | Schwabel |
| 4,751,137 A | 6/1988 | Halg |
| 4,751,138 A | 6/1988 | Tumey |
| 4,770,671 A | 9/1988 | Monroe |
| 4,799,939 A | 1/1989 | Bloecher |
| 4,800,685 A | 1/1989 | Haynes, Jr. |
| 4,881,951 A | 11/1989 | Wood |
| 4,898,597 A | 2/1990 | Hay |
| 4,903,440 A | 2/1990 | Larson |
| 4,916,869 A | 4/1990 | Oliver |
| 4,933,373 A | 6/1990 | Moren |
| 4,985,340 A | 1/1991 | Palazzotto |
| 4,991,362 A | 2/1991 | Heyer |
| 5,009,675 A | 4/1991 | Kunz |
| 5,086,086 A | 2/1992 | Brown-Wensley |
| 5,137,542 A | 8/1992 | Buchanan |
| 5,152,917 A | 10/1992 | Pieper |
| 5,181,939 A | 1/1993 | Neff |
| 5,201,916 A | 4/1993 | Berg |
| 5,213,591 A | 5/1993 | Celikkaya |
| 5,236,472 A | 8/1993 | Kirk |
| 5,254,194 A | 10/1993 | Ott |
| 5,282,875 A | 2/1994 | Wood |
| 5,366,523 A | 11/1994 | Rowenhorst |
| 5,376,428 A | 12/1994 | Palazzotto |
| 5,380,390 A | 1/1995 | Tselesin |
| 5,385,954 A | 1/1995 | Palazzotto |
| 5,417,726 A | 5/1995 | Stout |
| 5,435,816 A | 7/1995 | Spurgeon |
| 5,454,844 A | 10/1995 | Hibbard |
| 5,500,273 A | 3/1996 | Holmes |
| 5,554,068 A | 9/1996 | Carr |
| 5,573,619 A | 11/1996 | Benedict |
| 5,591,239 A | 1/1997 | Larson |
| RE35,570 E | 7/1997 | Rowenhorst |
| 5,672,097 A | 9/1997 | Hoopman |
| 5,672,186 A | 9/1997 | Chesley |
| 5,681,217 A | 10/1997 | Hoopman |
| 5,681,361 A | 10/1997 | Sanders, Jr. |
| 5,700,302 A | 12/1997 | Stoetzel |
| 5,712,210 A | 1/1998 | Windisch |
| 5,817,204 A | 10/1998 | Tselesin |
| 5,833,724 A | 11/1998 | Wei |
| 5,851,247 A | 11/1998 | Stoetzel |
| 5,858,140 A | 1/1999 | Berger |
| 5,863,306 A | 1/1999 | Wei |
| 5,891,204 A | 4/1999 | Neff |
| 5,908,476 A | 6/1999 | Nishio |
| 5,928,070 A | 7/1999 | Lux |
| 5,942,015 A | 8/1999 | Culler |
| 5,946,991 A | 9/1999 | Hoopman |
| 5,975,987 A | 11/1999 | Hoopman |
| 5,984,988 A | 11/1999 | Berg |
| 6,017,831 A | 1/2000 | Beardsley |
| 6,048,375 A | 4/2000 | Yang |
| 6,083,631 A | 7/2000 | Neff |
| 6,120,568 A | 9/2000 | Neff |
| 6,129,540 A | 10/2000 | Hoopman |
| 6,139,594 A | 10/2000 | Kincaid |
| 6,207,246 B1 | 3/2001 | Moren |
| 6,261,682 B1 | 7/2001 | Law |
| 6,293,980 B2 | 9/2001 | Wei |
| 6,302,930 B1 | 10/2001 | Lux |
| 6,319,108 B1 | 11/2001 | Adefris |
| 6,354,929 B1 | 3/2002 | Adefris |
| 6,521,004 B1 | 2/2003 | Culler |
| 6,551,366 B1 | 4/2003 | D'Souza |
| 6,620,214 B2 | 9/2003 | McArdle |
| 6,645,624 B2 | 11/2003 | Adefris |
| 6,702,650 B2 | 3/2004 | Adefris |
| 6,790,126 B2 | 9/2004 | Wood |
| 6,817,935 B2 | 11/2004 | Bates |
| 6,881,483 B2 | 4/2005 | McArdle |
| 6,913,824 B2 | 7/2005 | Culler |
| 6,951,504 B2 | 10/2005 | Adefris |
| 7,399,330 B2 | 7/2008 | Schwabel |
| 7,410,413 B2 | 8/2008 | Woo |
| 7,491,251 B2 | 2/2009 | Welygan |
| 7,727,931 B2 | 6/2010 | Brey |
| 7,887,608 B2 | 2/2011 | Schwabel |
| 8,034,137 B2 | 10/2011 | Erickson |
| 8,142,531 B2 | 3/2012 | Adefris |
| 8,142,532 B2 | 3/2012 | Erickson |
| 8,142,891 B2 | 3/2012 | Culler |
| 8,262,758 B2 | 9/2012 | Gao |
| 8,425,278 B2 | 4/2013 | Culler |
| 8,698,394 B2 | 4/2014 | McCutcheon |
| 8,869,740 B2 | 10/2014 | Moren |
| 9,440,332 B2 | 9/2016 | Gaeta |
| 2001/0041511 A1 | 11/2001 | Lack |
| 2002/0160694 A1 | 10/2002 | Wood |
| 2003/0022604 A1 | 1/2003 | Annen |
| 2003/0143938 A1 | 7/2003 | Braunschweig |
| 2005/0218566 A1 | 10/2005 | Suzuki |
| 2005/0279028 A1 | 11/2005 | Keipert |
| 2007/0254560 A1 | 11/2007 | Woo |
| 2008/0131705 A1 | 6/2008 | Colburn |
| 2008/0289262 A1 | 11/2008 | Gao |
| 2009/0165394 A1 | 7/2009 | Culler |
| 2009/0169816 A1 | 7/2009 | Erickson |
| 2010/0146867 A1 | 6/2010 | Boden |
| 2010/0151196 A1 | 6/2010 | Adefris |
| 2011/0088330 A1 | 4/2011 | Beekman |
| 2012/0137597 A1 | 6/2012 | Adefris |
| 2012/0227333 A1 | 9/2012 | Adefris |
| 2013/0040537 A1 | 2/2013 | Schwabel |
| 2013/0125477 A1 | 5/2013 | Adefris |
| 2013/0244552 A1 | 9/2013 | Lee |
| 2013/0252521 A1 | 9/2013 | Kasashima |
| 2013/0252522 A1 | 9/2013 | Kasashima |
| 2013/0344786 A1 | 12/2013 | Keipert |
| 2014/0000176 A1 | 1/2014 | Moren |
| 2014/0080393 A1 | 3/2014 | Ludwig |
| 2014/0106126 A1 | 4/2014 | Gaeta |
| 2014/0237907 A1 | 8/2014 | Boden |
| 2014/0259961 A1 | 9/2014 | Moren |
| 2014/0290147 A1 | 10/2014 | Seth |
| 2014/0291895 A1 | 10/2014 | Kanade |
| 2015/0210910 A1* | 7/2015 | Hejtmann ........... C04B 35/1115 51/309 |
| 2015/0267097 A1 | 9/2015 | Rosenflanz |
| 2015/0291865 A1 | 10/2015 | Breder |
| 2016/0221153 A1 | 8/2016 | Rizzo, Jr. |

(56) References Cited

U.S. PATENT DOCUMENTS

FOREIGN PATENT DOCUMENTS

| | | |
|---|---|---|
| CN | 101353566 | 1/2009 |
| CN | 103590090 | 2/2014 |
| CN | 104191385 | 12/2014 |
| CN | 104822494 A | 8/2015 |
| CN | 104999385 | 10/2015 |
| DE | 3042643 | 7/1981 |
| DE | 102012221316 | 5/2014 |
| DE | 202014101741 | 6/2014 |
| DE | 102013212609 | 12/2014 |
| DE | 102013212617 | 12/2014 |
| DE | 102013212639 | 12/2014 |
| DE | 102013212666 | 12/2014 |
| DE | 102013212684 | 12/2014 |
| EP | 1122718 A2 | 8/2001 |
| GB | 396231 | 8/1933 |
| GB | 1477767 | 6/1977 |
| JP | 63232947 | 9/1988 |
| JP | 0778509 | 3/1995 |
| JP | 11165252 | 6/1999 |
| JP | 2002053367 | 2/2002 |
| JP | 2004098265 | 4/2004 |
| JP | 2004098266 | 4/2004 |
| JP | 2005153106 | 6/2005 |
| JP | 2006089586 | 4/2006 |
| JP | 2006206908 A | 8/2006 |
| JP | 2012131017 | 7/2012 |
| JP | 2012131018 | 7/2012 |
| JP | 2015155142 | 8/2015 |
| JP | 5982580 | 8/2016 |
| KR | 1020100136807 | 12/2010 |
| KR | 101473367 | 5/2014 |
| SU | 1495100 | 7/1989 |
| WO | WO 94-27833 | 12/1994 |
| WO | WO 2009-011973 | 1/2009 |
| WO | WO 2010-041645 | 4/2010 |
| WO | WO 2012-112305 | 8/2012 |
| WO | WO 2015-048768 | 4/2015 |
| WO | WO 2015-088953 | 6/2015 |
| WO | WO 2015-100018 | 7/2015 |
| WO | WO 2015-100020 | 7/2015 |
| WO | WO 2015-100220 | 7/2015 |
| WO | WO 2017-136188 | 8/2017 |
| WO | WO 2018-080703 | 5/2018 |
| WO | WO 2018-080704 | 5/2018 |
| WO | WO 2018-080705 | 5/2018 |
| WO | WO 2018-080756 | 5/2018 |
| WO | WO 2018-080784 | 5/2018 |
| WO | WO 2018-080799 | 5/2018 |

OTHER PUBLICATIONS

Rampal, "Comparing the Magnetic Abrasives by Investigating the Surface Finish", Journal of Engineering, Computers & Applied Sciences (JEC&AS), Oct. 2012, vol. 1, No. 1, pp. 20-24.
Sodium and Potassium Silicates, PQ Europe, Oct. 2004, 16 pages.
International Search Report for PCT International Application No. PCT/US2017/055335, dated Jan. 24, 2018, 3 pages.

* cited by examiner

METHOD OF MAKING MAGNETIZABLE ABRASIVE PARTICLES

TECHNICAL FIELD

The present disclosure broadly relates to methods of making magnetizable abrasive particles.

BACKGROUND

Various types of abrasive articles are known in the art. For example, coated abrasive articles generally have abrasive particles adhered to a backing by a resinous binder material. Examples include sandpaper and structured abrasives having precisely shaped abrasive composites adhered to a backing. The abrasive composites generally include abrasive particles and a resinous binder.

Bonded abrasive particles include abrasive particles retained in a binder matrix that can be resinous or vitreous. Examples include, grindstones, cutoff wheels, hones, and whetstones.

Precise placement and orientation of abrasive particles in abrasive articles such as, for example, coated abrasive articles and bonded abrasive articles has been a source of continuous interest for many years.

For example, coated abrasive articles have been made using techniques such as electrostatic coating of abrasive particles have been used to align crushed abrasive particles with the longitudinal axes perpendicular to the backing. Likewise, shaped abrasive particles have been aligned by mechanical methods as disclosed in U. S. Pat. Appl. Publ. No. 2013/0344786 A1 (Keipert).

Precise placement and orientation of abrasive particles in bonded abrasive articles has been described in the patent literature. For example, U.S. Pat. No. 1,930,788 (Buckner) describes the use of magnetic flux to orient abrasive grain having a thin coating of iron dust in bonded abrasive articles. Likewise, British (GB) Pat. No. 396,231 (Buckner) describes the use of a magnetic field to orient abrasive grain having a thin coating of iron or steel dust to orient the abrasive grain in bonded abrasive articles. Using this technique, abrasive particles were radially oriented in bonded wheels.

U. S. Pat. Appl. Publ. No. 2008/0289262 A1 (Gao) discloses equipment for making abrasive particles in even distribution, array pattern, and preferred orientation. Using electric current to form a magnetic field causing acicular soft magnetic metallic sticks to absorb or release abrasive particles plated with soft magnetic materials.

SUMMARY

While depositing a layer of magnetizable material onto abrasive particles using bulk techniques such as solution coating, powder coating, or vapor coating is typically relatively straightforward, it is much more difficult to deposit the magnetizable material at a precise location on only a portion of the surface of abrasive particle. The problem is compounded when factors such as reproducibility, productivity, and cost are taken into account. Advantageously, the present method of making magnetizable abrasive particles overcomes these problems.

In one aspect, the present disclosure provides a method of making magnetizable abrasive particles, the method comprising sequentially:

providing a slurry layer disposed on a releasable substrate, wherein the slurry layer has an exposed surface, and wherein the slurry layer comprises magnetic particles, a binder precursor, and a liquid vehicle;

electrostatically contacting abrasive particles with the slurry layer, wherein the abrasive particles are aligned substantially oriented perpendicular to the surface of the releasable substrate, and wherein the abrasive particles are partially embedded within the slurry layer;

at least partially removing the liquid vehicle from the slurry layer and converting the binder precursor into a binder to provide a magnetizable layer comprising the magnetic particles and the binder, wherein the abrasive particles are partially embedded the magnetizable layer;

separating the magnetizable abrasive particles from the releasable substrate, wherein the magnetizable abrasive particles each respectively comprise a portion of the magnetizable layer disposed on a portion of one of the abrasive particles.

As used herein:

The term "ceramic" refers to any of various hard, brittle, heat- and corrosion-resistant materials made of at least one metallic element (which may include silicon) combined with oxygen, carbon, nitrogen, or sulfur. Ceramics may be crystalline or polycrystalline, for example.

The term "ferrimagnetic" refers to materials that exhibit ferrimagnetism. Ferrimagnetism is a type of permanent magnetism that occurs in solids in which the magnetic fields associated with individual atoms spontaneously align themselves, some parallel, or in the same direction (as in ferromagnetism), and others generally antiparallel, or paired off in opposite directions (as in antiferromagnetism). The magnetic behavior of single crystals of ferrimagnetic materials may be attributed to the parallel alignment; the diluting effect of those atoms in the antiparallel arrangement keeps the magnetic strength of these materials generally less than that of purely ferromagnetic solids such as metallic iron. Ferrimagnetism occurs chiefly in magnetic oxides known as ferrites. The spontaneous alignment that produces ferrimagnetism is entirely disrupted above a temperature called the Curie point, characteristic of each ferrimagnetic material. When the temperature of the material is brought below the Curie point, ferrimagnetism revives.

The term "ferromagnetic" refers to materials that exhibit ferromagnetism. Ferromagnetism is a physical phenomenon in which certain electrically uncharged materials strongly attract others. In contrast to other substances, ferromagnetic materials are magnetized easily, and in strong magnetic fields the magnetization approaches a definite limit called saturation. When a field is applied and then removed, the magnetization does not return to its original value. This phenomenon is referred to as hysteresis. When heated to a certain temperature called the Curie point, which is generally different for each substance, ferromagnetic materials lose their characteristic properties and cease to be magnetic; however, they become ferromagnetic again on cooling.

The terms "magnetic" and "magnetized" mean being ferromagnetic or ferrimagnetic at 20° C., or capable of being made so, unless otherwise specified. Preferably, magnetizable layers according to the present disclosure either have, or can be made to have by exposure to an applied magnetic field, a magnetic moment of at least 0.001 electromagnetic units (emu), more preferably at least 0.005 emu, more preferably 0.01 emu, up to an including 0.1 emu, although this is not a requirement.

The term "magnetic field" refers to magnetic fields that are not generated by any astronomical body or bodies (e.g., Earth or the sun). In general, magnetic fields used in practice of the present disclosure have a field strength in the region of the magnetizable abrasive particles being oriented of at least about 10 Gauss (1 mT), preferably at least about 100 Gauss (10 mT).

The term "magnetizable" means capable of being magnetized or already in a magnetized state.

The term "shaped abrasive particle" refers to a ceramic abrasive particle that has been intentionally shaped (e.g., extruded, die cut, molded, screen-printed) at some point during its preparation such that the resulting ceramic body is non-randomly shaped. The term "shaped abrasive particle" as used herein excludes ceramic bodies obtained by a mechanical crushing or milling operation.

The term "platey crushed abrasive particle", which refers to a crushed abrasive particle resembling a platelet and/or flake that is characterized by a thickness that is less than the width and length. For example, the thickness may be less than ½, ⅓, ¼, ⅕, ⅙, 1/7, ⅛, 1/9, or even less than 1/10 of the length and/or width. Likewise, the width may be less than ½, ⅓, ¼, ⅕, ⅙, 1/7, ⅛, 1/9, or even less than 1/10 of the length.

The term "essentially free of" means containing less than 5 percent by weight (e.g., less than 4, 3, 2, 1, 0.1, or even less than 0.01 percent by weight, or even completely free) of, based on the total weight of the object being referred to.

The terms "precisely-shaped abrasive particle" refers to an abrasive particle wherein at least a portion of the abrasive particle has a predetermined shape that is replicated from a mold cavity used to form a precursor precisely-shaped abrasive particle that is sintered to form the precisely-shaped abrasive particle. A precisely-shaped abrasive particle will generally have a predetermined geometric shape that substantially replicates the mold cavity that was used to form the abrasive particle.

The term "length" refers to the longest dimension of an object.

The term "width" refers to the longest dimension of an object that is perpendicular to its length.

The term "thickness" refers to the longest dimension of an object that is perpendicular to both of its length and width.

The term "aspect ratio" refers to the ratio length/thickness of an object.

The term "substantially" means within 35 percent (preferably within 30 percent, more preferably within 25 percent, more preferably within 20 percent, more preferably within 10 percent, and more preferably within 5 percent) of the attribute being referred to.

Features and advantages of the present disclosure will be further understood upon consideration of the detailed description as well as the appended claims.

It should be understood that numerous other modifications and embodiments can be devised by those skilled in the art, which fall within the scope and spirit of the principles of the disclosure. The figure may not be drawn to scale.

DETAILED DESCRIPTION

Methods according to the present disclosure include a series of sequential steps, which may be consecutive or not.

Figure 1:
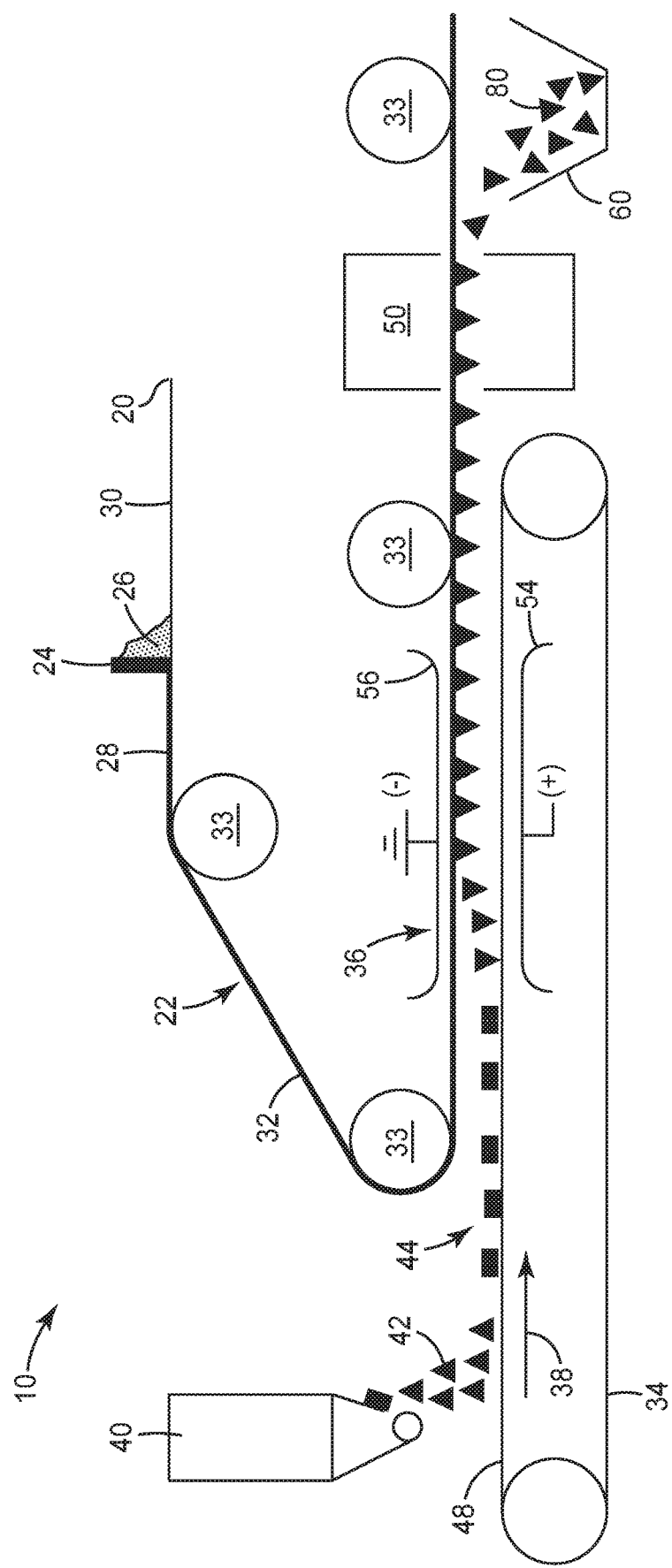
FIG. 1 is a schematic process flow diagram of an exemplary method 10 of making magnetizable abrasive particles according to the present disclosure.

Referring now to FIG. 1, in exemplary method 10 according to the present disclosure, releasable substrate 20 is advanced along a web path 22 past a coater 24 which applies a curable slurry 26 forming a slurry layer 28 on a first major surface 30 of the backing thereby creating a coated substrate 32. The curable slurry 26 and slurry layer 28 comprise magnetic particles, a binder precursor, and a liquid vehicle (each not shown). The coated substrate 32 is guided along the web path 22 by appropriate guide rolls 33 such that the coated substrate is positioned above and generally parallel to a conveyor belt 34 with the slurry layer 28 on the substrate 20 facing the conveyor belt. Located prior to an electrostatic field generating apparatus 36, with respect to the conveyor belt's direction of travel 38, a particle feeder 40 applies a layer 44 of abrasive particles 42 (shown as triangular abrasive platelets) onto a support surface 48 of the conveyor belt. After application of the abrasive particles, the conveyor belt 34 moves the particle layer through an electrostatic field created by the electrostatic field generating apparatus 36. The coated substrate 32 is also guided by the web path 22 through the electrostatic field above the conveyor belt. Electrostatic field generating apparatus 36 has positive electrode 54 and ground (or negative) electrode 56. As it passes through electrostatic field generating apparatus 36, abrasive particles 42 are drawn upward toward electrode 56 until they become partially embedded into slurry layer 28. The embedded particles are then transported to oven 50 where the liquid vehicle of the slurry is at least partially (preferably essentially completely) removed and the binder precursor is converted into a binder, thereby forming magnetizable layer. Next, magnetizable abrasive particles 80 are separated from releasable substrate 20 and isolated in collection bin 60. Any excess magnetizable layer particles or coating on the abrasive particles may be separated from the magnetizable abrasive particles at this point; e.g., by sieving, agitation, magnetic field, or other suitable technique.

More generally, in a first step, a slurry layer disposed on a releasable substrate is provided. The slurry layer has an exposed surface, and comprises magnetizable particles, a binder precursor, and a liquid vehicle. Typically, the magnetizable particles and binder precursor are well-dispersed in the liquid vehicle, although this is not a requirement. Methods for preparing and coating slurries are well-known to those of ordinary skill in the art. Examples of suitable mixers useful for preparing slurries include high shear mixers. Examples of coating techniques include roll-coating, knife coating, and gravure coating. The thickness of the coating is preferably from 1/10 to ¼ of the height of the abrasive particles after they are embedded in the slurry, although this is not a requirement.

The magnetic particles comprise magnetizable material such as, for example: iron; cobalt; nickel; various alloys of nickel and iron marketed as Permalloy in various grades; various alloys of iron, nickel and cobalt marketed as Fernico, Kovar, FerNiCo I, or FerNiCo II; various alloys of iron, aluminum, nickel, cobalt, and sometimes also copper and/or titanium marketed as Alnico in various grades; alloys of iron, silicon, and aluminum (typically about 85:9:6 by weight) marketed as Sendust alloy; Heusler alloys (e.g., $Cu_2MnSn$); manganese bismuthide (also known as Bismanol); rare earth magnetizable materials such as gadolinium, dysprosium, holmium, europium oxide, alloys of neodymium, iron and boron (e.g., $Nd_2Fe_{14}B$), and alloys of samarium and cobalt (e.g., $SmCo_5$); MnSb; $MnOFe_2O_3$; $Y_3Fe_5O_{12}$; $CrO_2$; MnAs; ferrites such as ferrite, magnetite; zinc ferrite; nickel ferrite; cobalt ferrite, magnesium ferrite, barium ferrite, and strontium ferrite; yttrium iron garnet; and combinations of the foregoing. In some preferred embodiments, the magnetizable material comprises at least one metal selected from iron, nickel, and cobalt, an alloy of two or more such metals, or an alloy of at one such metal with at least one element selected from phosphorus and manganese. In some preferred embodiments, the magnetizable material is an alloy containing 8 to 12 weight percent (wt. %) of aluminum, 15 to 26 wt. % of nickel, 5 to 24 wt. % of cobalt, up to 6 wt. % of copper, up to 1 wt. % of titanium, wherein the balance of material to add up to 100 wt. % is iron.

The magnetizable particles may have any size, but are preferably much smaller than the abrasive particles as judged by average particle diameter, preferably 4 to 2000 times smaller, more preferably 100 to 2000 times smaller, and even more preferably 500 to 2000 times smaller, although other sizes may also be used. In this embodiment, the magnetizable particles may have a Mohs hardness of less than 6 (e.g., less than 5, or less than 4), although this is not a requirement.

Exemplary binder precursors include organic binder precursors such as thermosetting resins and thermoplastics. Exemplary organic binder precursors include glues, phenolic resins, aminoplast resins, urea-formaldehyde resins, melamineformaldehyde resins, urethane resins, acrylic resins (e.g., aminoplast resins having pendant $\alpha,\beta$-unsaturated groups, acrylated urethanes, acrylated epoxy resins, acrylated isocyanurates), acrylic monomer/oligomer resins, epoxy resins (including bismaleimide and fluorene-modified epoxy resins), isocyanurate resins, an combinations thereof. Curatives such as thermal initiators, catalysts, photoinitiators, hardeners, and the like may be added to the organic binder precursor, typically selected and in an effective amount according to the resin system chosen, and their use is within the level of skill of those practicing in the art. Exemplary thermoplastic resins may include thermoplastic acrylic polymers and thermoplastic polyurethanes. Appropriate curative(s), if any, for the selected resin may be included in the slurry.

Preferably, the slurry should be sufficiently viscous that sagging of the particles after embedding in the slurry layer to become less oriented is minimized, although some degree of such sagging may be acceptable.

The liquid vehicle may be any liquid that can be removed from the slurry composition. Typically, the liquid vehicle may be a liquid vehicle such as water or a mixture of water and a miscible volatile organic solvent or solvents (e.g., methanol, ethanol, isopropanol, glyme, diglyme, propylene glycol, and/or acetone).

The releasable substrate is selected such that when liquid vehicle is removed and the binder precursor is converted into binder to form the magnetizable layer, the magnetizable layer can be released from the substrate, preferably cleanly released. Exemplary releasable substrates include webs and films of polyolefin (e.g., polyethylene, polypropylene), fluoropolymer (e.g., polytetrafluorethylene (PTFE), fluorinated ethylene-propylene polymer (FEP), polyvinylidene fluoride (PVDF), and hexafluoropropylene films (HFP)), silicone, siliconized polyester, and siliconized paper. Webs and films of other materials that are not particularly releasable may also be used; for example, with a surface-applied mold release treatment.

In a second step, abrasive particles are electrostatically contacted with the slurry layer. By the term "electrostatically contacted", it is meant that the abrasive particles are urged while influenced by electrostatic interaction toward the slurry layer until contact is achieved and the particles become partially embedded in the slurry layer. Typically, this is done by electrostatically urging the abrasive particles onto the slurry while it is within an applied electrostatic field. Due to orientation of the abrasive particles that occurs during electrostatic deposition of the abrasive particles, they can be preferentially aligned substantially oriented with their longitudinal axis perpendicular to the surface of the slurry layer in the case of needle-shaped abrasive particles, or with major planar surfaces oriented perpendicular to the surface of the substrate in the case of platelets or similar shapes. In embodiments wherein the abrasive particles are precisely-shaped truncated trigonal pyramids, the particles typically contact the slurry layer along one edge with the triangular faces oriented substantially parallel to the applied electrostatic filed, which is preferably perpendicular to the slurry layer.

Electrostatic deposition of abrasive particles onto a curable layer (e.g., a make coat) is well-known in the abrasive art (e.g., see U.S. Pat. No. 2,318,570 (Carlton) and U.S. Pat. No. 8,869,740 (Moren et al.)), and analogous technique wherein the slurry layer is substituted for the curable layer is effective for accomplishing electrostatic deposition of abrasive particles.

The abrasive particles can be particles of any abrasive material. Useful abrasive materials that can be used include, for example, fused aluminum oxide, heat treated aluminum oxide, white fused aluminum oxide, ceramic aluminum oxide materials such as those commercially available as 3M CERAMIC ABRASIVE GRAIN from 3M Company of St. Paul, Minn., black silicon carbide, green silicon carbide, titanium diboride, boron carbide, tungsten carbide, titanium carbide, cubic boron nitride, garnet, fused alumina zirconia, sol-gel derived ceramics (e.g., alumina ceramics doped with chromia, ceria, zirconia, titania, silica, and/or tin oxide), silica (e.g., quartz, glass beads, glass bubbles and glass fibers), feldspar, or flint. Examples of sol-gel derived crushed ceramic particles can be found in U.S. Pat. No. 4,314,827 (Leitheiser et al.), U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.). Further details concerning methods of making sol-gel-derived abrasive particles can be found in, for example, U.S. Pat. No. 4,314,827 (Leitheiser), U.S. Pat. No. 5,152,917 (Pieper et al.), U.S. Pat. No. 5,213,591 (Celikkaya et al.), U.S. Pat. No. 5,435,816 (Spurgeon et al.), U.S. Pat. No. 5,672,097 (Hoopman et al.), U.S. Pat. No. 5,946,991 (Hoopman et al.), U.S. Pat. No. 5,975,987 (Hoopman et al.), and U.S. Pat. No. 6,129,540 (Hoopman et al.), and in U. S. Publ. Pat. Appln. Nos. 2009/0165394 A1 (Culler et al.) and 2009/0169816 A1 (Erickson et al.).

The abrasive particles may be shaped (e.g., precisely-shaped) or random (e.g., crushed and/or platey). Shaped abrasive particles and precisely-shaped abrasive particles may be prepared by a molding process using sol-gel technology as described, for example, in U.S. Pat. No. 5,201,916 (Berg), U.S. Pat. No. 5,366,523 (Rowenhorst (Re 35,570)), U.S. Pat. No. 5,984,988 (Berg), U.S. Pat. No. 8,142,531 (Adefris et al.), and U. S. Pat. Appln. Publ. No. 2010/0146867 (Boden et al.).

U.S. Pat. No. 8,034,137 (Erickson et al.) describes alumina particles that have been formed in a specific shape, then crushed to form shards that retain a portion of their original shape features. In some embodiments, the abrasive particles are precisely-shaped (i.e., the abrasive particles have shapes that are at least partially determined by the shapes of cavities in a production tool used to make them).

Exemplary shapes of abrasive particles include crushed, pyramids (e.g., 3-, 4-, 5-, or 6-sided pyramids), truncated pyramids (e.g., 3-, 4-, 5-, or 6-sided truncated pyramids), cones, truncated cones, rods (e.g., cylindrical, vermiform), and prisms (e.g., 3-, 4-, 5-, or 6-sided prisms). In some embodiments (e.g., truncated pyramids and prisms), the abrasive particles respectively comprise platelets having two opposed major facets connected to each other by a plurality of side facets.

In some embodiments, the abrasive particles and/or magnetizable abrasive particles have an aspect ratio of at least 2, at least 3, at least 5, or even at least 10, although this is not a requirement. Preferably, abrasive particles used in practice of the present disclosure have a Mohs hardness of at least 6, at least 7, or at least 8, although other hardnesses can also be used.

Further details concerning abrasive particles and methods for their preparation can be found, for example, in U.S. Pat. No. 8,142,531 (Adefris et al.), U.S. Pat. No. 8,142,891 (Culler et al.), and U.S. Pat. No. 8,142,532 (Erickson et al.), and in U. S. Pat. Appl. Publ. Nos. 2012/0227333 (Adefris et al.), 2013/0040537 (Schwabel et al.), and 2013/0125477 (Adefris).

In a third step, the liquid vehicle is at least partially removed from the slurry layer, and optionally the binder precursor is cured or otherwise hardened, and converting the binder precursor into a binder. This provides a reasonably durable magnetizable layer disposed on the embedded abrasive particles. Removal of the liquid vehicle may be accomplished using an oven or other evaporative means (e.g., forced air). Curing may be accomplished by heating (in the case of thermal cures) and/or by actinic radiation (e.g., electromagnetic and/or particulate radiation). Removal of the liquid vehicle and conversion of the binder precursor to the binder may be accomplished in the same or different steps. Preferably, curing is thermally accomplished so that a single process step is sufficient. After this point, the magnetizable layer and abrasive particles are still attached to the releasable substrate.

In a fourth step, the partially coated abrasive particles are separated from the releasable substrate to provide the magnetizable abrasive particles. Preferably, the release of the magnetizable layer may be effected by cracking the magnetizable layer (e.g., by beating and/or flexing the releasable substrate, vibration, or by winding the releasable substrate around or over a small diameter bar or roller), although other methods can also be used.

Magnetizable abrasive particles according to the present disclosure may be independently sized according to an abrasives industry recognized specified nominal grade. Exemplary abrasive industry recognized grading standards include those promulgated by ANSI (American National Standards Institute), FEPA (Federation of European Producers of Abrasives), and JIS (Japanese Industrial Standard). ANSI grade designations (i.e., specified nominal grades) include, for example: ANSI 4, ANSI 6, ANSI 8, ANSI 16, ANSI 24, ANSI 36, ANSI 46, ANSI 54, ANSI 60, ANSI 70, ANSI 80, ANSI 90, ANSI 100, ANSI 120, ANSI 150, ANSI 180, ANSI 220, ANSI 240, ANSI 280, ANSI 320, ANSI 360, ANSI 400, and ANSI 600. FEPA grade designations include F4, F5, F6, F7, F8, F10, F12, F14, F16, F18, F20, F22, F24, F30, F36, F40, F46, F54, F60, F70, F80, 90, F100, F120, F150, F180, F220, F230, F240, F280, F320, F360, F400, F500, F600, F800, F1000, F1200, F1500, and F2000. JIS grade designations include 1158, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10,000.

Alternatively, the magnetizable abrasive particles can be graded to a nominal screened grade using U.S.A Standard Test Sieves conforming to ASTM E-11 "Standard Specification for Wire Cloth and Sieves for Testing Purposes". ASTM E-11 prescribes the requirements for the design and construction of testing sieves using a medium of woven wire cloth mounted in a frame for the classification of materials according to a designated particle size. A typical designation may be represented as −18+20 meaning that the magnetizable abrasive particles pass through a test sieve meeting ASTM E-11 specifications for the number 18 sieve and are retained on a test sieve meeting ASTM E-11 specifications for the number 20 sieve. In one embodiment, the magnetizable abrasive particles have a particle size such that most of the particles pass through an 18 mesh test sieve and can be retained on a 20, 25, 30, 35, 40, 45, or 50 mesh test sieve. In various embodiments, the magnetizable abrasive particles can have a nominal screened grade of: −18+20, −20/+25, −25+30, −30+35, −35+40, −40+45, −45+50, −50+60, −60+70, −70/+80, −80+100, −100+120, −120+140, −140+170, −170+200, −200+230, −230+270, −270+325, −325+400, −400+450, −450+500, or −500+635. Alternatively, a custom mesh size can be used such as −90+100.

Magnetizable abrasive particles prepared according to the present disclosure can be used in loose form (e.g., free-flowing or in a slurry) or they may be incorporated into various abrasive articles (e.g., coated abrasive articles, bonded abrasive articles, nonwoven abrasive articles, and/or abrasive brushes). Due to their magnetic properties, they can be oriented and manipulated using magnetic fields to provide the above various abrasive articles having enhanced properties.

SELECT EMBODIMENTS OF THE PRESENT DISCLOSURE

In a first embodiment, the present disclosure provides a method of making magnetizable abrasive particles, the method comprising sequentially:

providing a slurry layer disposed on a releasable substrate, wherein the slurry layer has an exposed surface, and wherein the slurry layer comprises magnetic particles, a binder precursor, and a liquid vehicle;

electrostatically contacting abrasive particles with the slurry layer, wherein the abrasive particles are aligned substantially oriented perpendicular to the surface of the releasable substrate, and wherein the abrasive particles are partially embedded within the slurry layer;

at least partially removing the liquid vehicle from the slurry layer and converting the binder precursor into a binder to provide a magnetizable layer comprising the magnetic particles and the binder, wherein the abrasive particles are partially embedded the magnetizable layer;

separating the magnetizable abrasive particles from the releasable substrate, wherein the magnetizable abrasive particles each respectively comprise a portion of the magnetizable layer disposed on a portion of one of the abrasive particles.

In a second embodiment, the present disclosure provides a method of making magnetizable abrasive particles according to the first embodiment, wherein the abrasive particles comprise shaped abrasive particles.

In a third embodiment, the present disclosure provides a method of making magnetizable abrasive particles according to the second embodiment, wherein the abrasive particles comprise precisely-shaped abrasive particles.

In a fourth embodiment, the present disclosure provides a method of making magnetizable abrasive particles according to any one of the first to third embodiments, wherein the abrasive particles respectively comprise platelets having two opposed major facets connected to each other by a plurality of side facets, wherein each magnetizable layer completely covers a respective one of the side facets.

In a fifth embodiment, the present disclosure provides a method of making magnetizable abrasive particles according to the fourth embodiment, wherein the platelets are triangular.

In a sixth embodiment, the present disclosure provides a method of making magnetizable abrasive particles according to the first embodiment, wherein the abrasive particles comprise crushed abrasive particles having an aspect ratio of at least 2.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Unless stated otherwise, all other reagents were obtained, or are available from fine chemical vendors such as Sigma-Aldrich Company, St. Louis, Mo., or may be synthesized by known methods.

Materials used in the Examples are reported in Table 1, below.

TABLE 1

| ABBRE-VIATION | DESCRIPTION |
|---|---|
| CM | Silane Treated Calcium Metasilicate, obtained as 400 WOLLASTOCOAT, obtained from NYCO Minerals Inc., Willsboro, New York. |
| MAG1 | Magnetite particles, obtained as PIROX 100 from Pittsburgh Iron Oxides, Pittsburgh, Pennsylvania. |
| MAG2 | Fe/Al/Si magnetizable alloy particles, obtained as SENDUST from Micrometals, Shenzhen, People's Republic of China. |
| PR | Resole phenol-formaldehyde resin, a 1.5:1 to 2.1:1 (phenol:formaldehyde) condensate catalyzed by 2.5% potassium hydroxide. |
| PTFE | Polytetrafluoroethylene film with thickness of 0.015 inch (0.038 centimeter), obtained as TFV-015-R12 from Plastics International, Eden Prairie, Minnesota. |
| SAP | Shaped abrasive particles were prepared according to the disclosure of U.S. Pat. No. 8,142,531 (Adefris et al). The shaped abrasive particles were prepared by molding alumina sol gel in equilateral triangle-shaped polypropylene mold cavities. After drying and firing, the resulting shaped abrasive particles were about 1.4 mm (side length) × 0.35 mm thick, with a draft angle approximately 98 degrees. |
| SUR | Surfactant, obtained under the trade designation TERGITOL 15-S-5, obtained from Dow Chemical Company, Midland, Michigan. |

Examples 1 to 7 and Comparative Example A

For each of Examples 1 to 7 and Comparative Example A, a mixture was prepared according to the composition listed in Table 2. The mixture was dispersed by a mixer operated at between 800 and 1500 revolutions per minute for approximately five minutes until the mixture was homogeneous. The mixture was then applied to a 7-inch (17.8-centimeter) diameter PTFE disc with the coating weight listed in Table 2. While the mixture was still wet, SAP were electrostatically coated on the disc (with SAP coating weight listed in Table 3), so that the majority of the abrasive particles stood in the upright direction with an edge base laying on the PTFE disc.

TABLE 2

| | WEIGHT PERCENT | | | | | | | |
|---|---|---|---|---|---|---|---|---|
| COMPOSITION | Example 1 | Example 2 | Example 3 | Example 4 | Example 5 | Example 6 | Example 7 | Comparative Example A |
| PR | 42.4 | 40.7 | 42.3 | 42.4 | 42.4 | 42.4 | 40.7 | 54.4 |
| MAG1 | 12.7 | 17.7 | 1.1 | 3.2 | 6.4 | 0 | 0 | 0 |
| MAG2 | 0 | 0 | 0 | 0 | 0 | 12.7 | 17.7 | 0 |
| SUR | 1.0 | 1.0 | 1.0 | 1.0 | 1.0 | 1.0 | 1.0 | 0 |
| CM | 22.7 | 21.8 | 34.4 | 32.2 | 29.0 | 22.7 | 21.8 | 44.2 |
| Water | 21.2 | 18.8 | 21.2 | 21.2 | 21.2 | 21.2 | 18.8 | 1.4 |

TABLE 3

| | Example 1 | Example 2 | Example 3 | Example 4 | Example 5 | Example 6 | Example 7 | Comparative Example A |
|---|---|---|---|---|---|---|---|---|
| Mixture Coating Weight, Grams | 2.0 | 2.0 | 2.0 | 2.0 | 2.0 | 2.0 | 2.0 | 1.6 |
| SAP Coating Weight, grams | 20.0 | 18.5 | 14.4 | 12.2 | 18.2 | 20.0 | 18.5 | 15.0 |

The coated PTFE disc with abrasive particles was placed into an oven at 150° F. (65.5° C.) for 15 minutes then at 210° F. (98.9° C.) for 90 minutes. After curing, the mixture coated on the PTFE disc had a dry thickness of approximately 2 mil (0.051 millimeters). The dried PTFE disc was then crushed by hand to release the abrasive particles from the disc.

Figure 2:
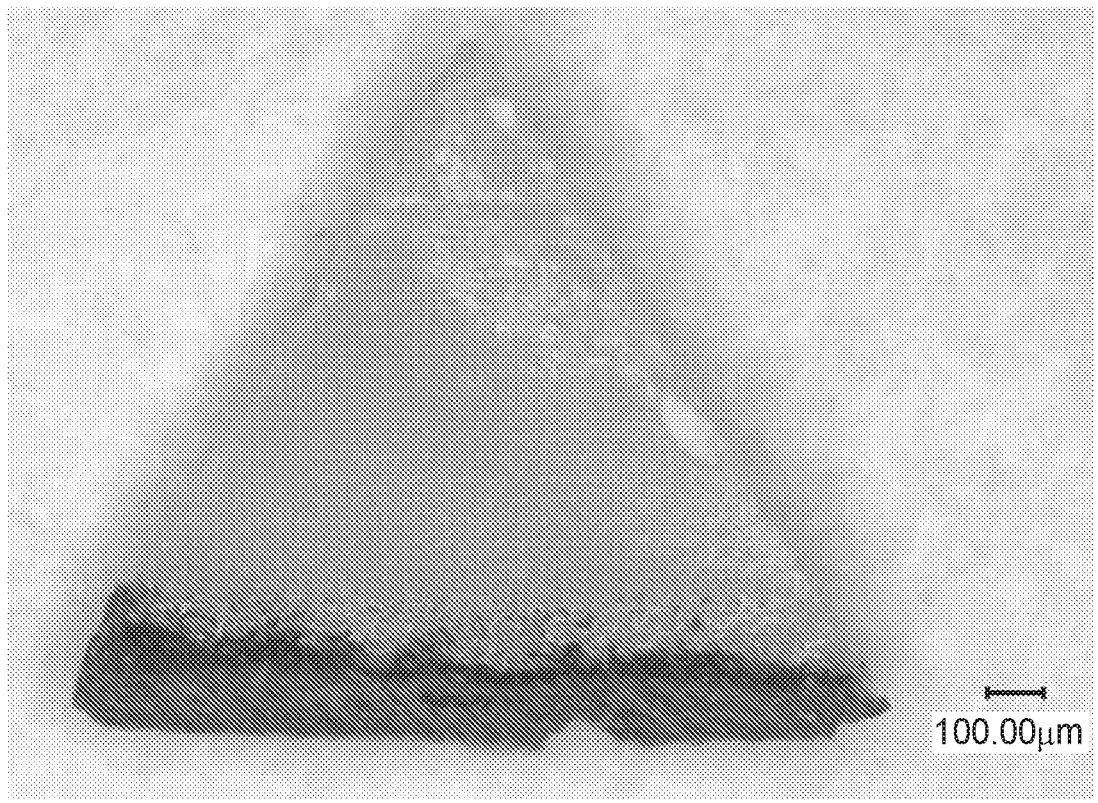
FIG. 2 is a digital photograph of a magnetizable abrasive particle produced in Example 1.

The majority of the released abrasive particles from Examples 1 to 7 had a coating on one edge with a coating thickness of 2 mil (0.051 millimeter). A photo of an edge-coated abrasive particle obtained from Example 1 is shown in FIG. 2, wherein the edge coating is on the bottom edge of the particle. The released abrasive particles resulted from Examples 1 to 7 and Comparative A were tested for their response to a Neodymium block magnet with a pull force of 73.33 pounds (326.2 Newton) and a surface field of 1152 Gauss. Their observed responses are reported in Table 4, below, wherein "strong" response means greater than 90 percent aligned, "intermediate" response means from 50 to 90 percent aligned, and "weak" response means less than 50 percent aligned.

TABLE 4

|  | RESPONSE |
| --- | --- |
| Example 1 | strong |
| Example 2 | strong |
| Example 3 | weak |
| Example 4 | weak |
| Example 5 | intermediate |
| Example 6 | strong |
| Example 7 | strong |
| Comparative Example A | none |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of making magnetizable abrasive particles, the method comprising sequentially:
   providing a slurry layer disposed on a releasable substrate, wherein the slurry layer has an exposed surface, and wherein the slurry layer comprises magnetic particles, a binder precursor, and a liquid vehicle;
   electrostatically contacting abrasive particles with the slurry layer, wherein the abrasive particles are aligned substantially oriented perpendicular to the surface of the releasable substrate, and wherein the abrasive particles are partially embedded within the slurry layer;
   at least partially removing the liquid vehicle from the slurry layer and converting the binder precursor into a binder to provide a magnetizable layer comprising the magnetic particles and the binder, wherein the abrasive particles are partially embedded in the magnetizable layer;
   separating the magnetizable abrasive particles from the releasable substrate, wherein the magnetizable abrasive particles each respectively comprise a portion of the magnetizable layer is disposed on a portion of each of the abrasive particles.

2. The method of claim 1, wherein the abrasive particles comprise shaped abrasive particles.

3. The method of claim 2, wherein the abrasive particles comprise precisely-shaped abrasive particles.

4. The method of claim 1, wherein the abrasive particles respectively comprise platelets having two opposed major facets connected to each other by a plurality of side facets, wherein each magnetizable layer completely covers a respective one of the side facets.

5. The method of claim 4, wherein the platelets are triangular.

6. The method of claim 1, wherein the abrasive particles comprise crushed abrasive particles having an aspect ratio of at least 2.

* * * * *